US009713902B2

(12) United States Patent
Susnjara et al.

(10) Patent No.: US 9,713,902 B2
(45) Date of Patent: Jul. 25, 2017

(54) ADDITIVE MANUFACTURING APPARATUS

(71) Applicant: THERMWOOD CORPORATION, Dale, IN (US)

(72) Inventors: Kenneth J. Susnjara, Birdseye, IN (US); Brian Scott Smiddy, Newburgh, IN (US)

(73) Assignee: Thermwood Corporation, Dale, IN (US)

( * ) Notice: Subject to any disclaimer, the term of this patent is extended or adjusted under 35 U.S.C. 154(b) by 75 days.

(21) Appl. No.: 14/701,631

(22) Filed: May 1, 2015

(65) Prior Publication Data

US 2016/0318248 A1 Nov. 3, 2016

(51) Int. Cl.
| | |
|---|---|
| *B29C 67/00* | (2017.01) |
| *B33Y 30/00* | (2015.01) |
| *B25J 9/02* | (2006.01) |
| *B25J 19/00* | (2006.01) |
| *B29C 47/00* | (2006.01) |
| *B25J 5/04* | (2006.01) |

(Continued)

(52) U.S. Cl.
CPC ............ *B29C 67/0055* (2013.01); *B25J 5/04* (2013.01); *B25J 9/026* (2013.01); *B25J 11/00* (2013.01); *B25J 15/0019* (2013.01); *B25J 15/0491* (2013.01); *B25J 19/0025* (2013.01); *B29C 47/0002* (2013.01); *B29C 67/0059* (2013.01); *B29C 67/0088* (2013.01); *B33Y 30/00* (2014.12); *B23Q 5/02* (2013.01); *B29C 67/0051* (2013.01); *B29C 67/0085* (2013.01); *B29K 2101/12* (2013.01); *B29K 2105/0067* (2013.01); *B33Y 10/00* (2014.12); *B33Y 50/02* (2014.12)

(58) Field of Classification Search
CPC ......... B33Y 10/00; B33Y 30/00; B33Y 50/02; B29C 67/0051; B29C 67/0055; B29C 67/0085; B29C 67/0088
USPC ............................................... 425/375, 174.4
See application file for complete search history.

(56) References Cited

U.S. PATENT DOCUMENTS

| | | | |
|---|---|---|---|
| 6,350,222 B2 * | 2/2002 | Susnjara ........................... 483/1 |
| 2005/0141975 A1 * | 6/2005 | Hardesty .................. B23Q 5/04 409/201 |
| 2010/0318222 A1 * | 12/2010 | Khoshnevis ........ B29C 67/0055 700/245 |

FOREIGN PATENT DOCUMENTS

WO 2005/070657 A1 8/2005

OTHER PUBLICATIONS

Aug. 22, 2016—International Search Report and Written Opinion, International App. No. PCT/US2016/028845.

* cited by examiner

*Primary Examiner* — Alison L Hindenlang
*Assistant Examiner* — Lawrence D Hohenbrink, Jr.
(74) *Attorney, Agent, or Firm* — Bookoff McAndrews, PLLC

(57) ABSTRACT

A CNC machine including a worktable displaceable along a y-axis, a gantry disposed along an x-axis, either fixed or displaceable along the y-axis, a carriage on such gantry displaceable along the x-axis and including a thermoplastic material extrusion conduit, a tool carrier mounted on such carriage displaceable along a z-axis, a dispersion conduit mounted on such tool carrier accommodating an applicator, means mounted on such applicator for extruding a molten bead of a thermoplastic material, a flexible hose interconnecting such molten material forming means and such applicator, a plurality of servomotors for linearly or rota- (Continued)

tionally displacing such components along or about such axes and a computer for controlling such component displacements.

27 Claims, 7 Drawing Sheets

(51) Int. Cl.
*B25J 11/00* (2006.01)
*B25J 15/00* (2006.01)
*B25J 15/04* (2006.01)
B29K 101/12 (2006.01)
B29K 105/00 (2006.01)
B33Y 50/02 (2015.01)
B33Y 10/00 (2015.01)
B23Q 5/02 (2006.01)

ADDITIVE MANUFACTURING APPARATUS

This invention relates to an apparatus for forming a configured article and more particularly to such an apparatus provided with improved means for effectively and economically forming such article by an extrusion process.

BACKGROUND OF THE INVENTION

In the prior art, there has been developed a process commonly referred to as an additive manufacturing process which generally consists of forming various bodies by extruding a bead of a molten thermoplastic material, applying such bead of molten material in a strata of layers to form a replica of an article sought to be formed and then machining such replica when cooled to remove excess material and provide the final configuration of the intended article, in practicing such process, several aspects thereof have been noted. In procedures where thick beads of molten material are produced, it has been found that an oversized replica of the intended article results, requiring excessive machining in producing the final article configuration, requiring increased production time and excessive scarp material. In forming comparatively large articles, it further has been found that lain strata of extruded material are apt to cool thereby impairing the fusion of a layer of molten material applied thereon. Such lack of fusion may be overcome by tamping an overlying, molten bead segment to induce fusion. Such remedial measure however, has the effect of causing the bulging of applied layers, often requiring additional machining. In seeking to overcome the disadvantages of the use of thick beads of molten material, thin beads of material have been employed. Such use has been effective in reducing machine time but results in a substantial increase in overall production time thereby negatively affecting productively.

In view of the foregoing, it is the principal object of the present invention to provide an improved apparatus for producing an article through the use of an additive material process, requiring little if any machining of a molded body in providing a final product.

BRIEF DESCRIPTION OF THE INVENTION

The principal object of the present invention is achieved by an apparatus including a worktable supported on a bed, having a support surface disposed in an x-y plane, disposed in one of a fixed condition on such bed and a displaceable condition along a y-axis; a gantry supported on such bed along an x-axis, disposed in one of a fixed condition on such bed with a worktable displaceable along the y-axis and a displaceable condition along the y-axis on such bed with such worktable disposed in a fixed condition on such bed; a carriage mounted on such gantry, displaceable along a y-axis, provided with means for forming a molten thermoplastic material extrudable through an outlet conduit thereof; a tool carrier mounted on such carriage, displaceable along a z-axis; a tool holder mounted on such tool carrier, rotatably displaceable about a z-axis; a tool support shaft provided with an axis disposed in an x-y plane, journaled in such tool holder and rotatably displaceable about the axis thereof; a dispenser conduit mounted on such tool support shaft, disposed perpendicularly relative to the axis thereof, accommodating a nozzle at an outlet end thereof; means mountable on such dispenser conduit for applying a formed, molten bead of a molten thermoplastic material; a flexible hose provided with a first end supported on such tool conduit of the material extrusion means, and a second end attached to an inlet of the dispenser conduit; a plurality of servomotors each operatively connected to one of such aforementioned components for selectively displacing such one component in one of a rotational and linear movement; and a control computer operatively connected to such servomotors for operation in execution of a program inputted into the control thereof.

DETAILED DESCRIPTION OF THE PREFERRED EMBODIMENT OF THE INVENTION

Figure 1:
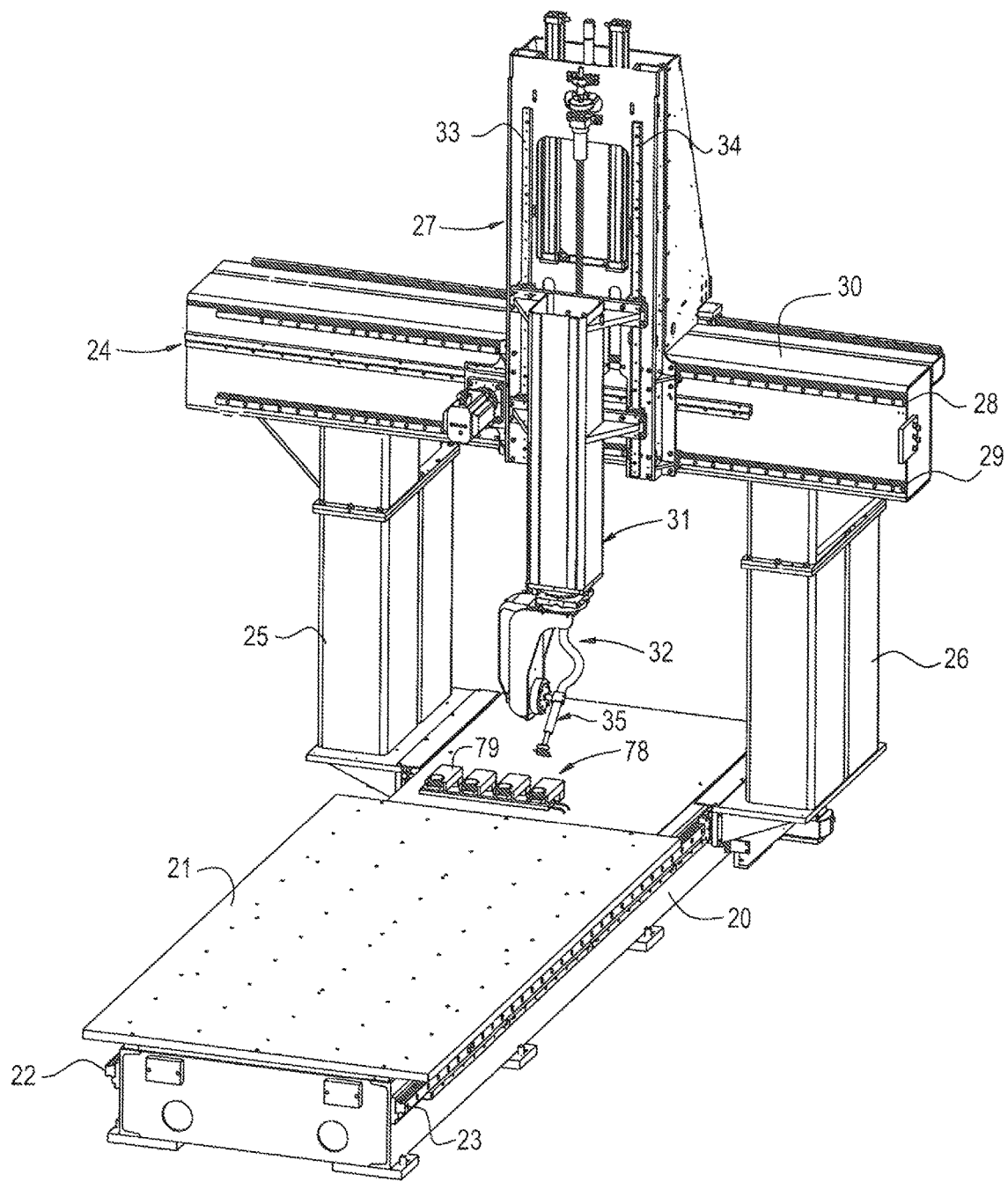
FIG. 1 is a perspective view of a CNC machine incorporating the present invention.

Referring to FIG. 1 of the drawings, there is illustrated a CNC machine which embodies the present invention, Such machine includes a bed 20, a worktable 21 having a support surface lying in an x-y plane, mounted on a set of guide rails 22 and 23 and displaceable along a y-axis by a pair of servomotors drivingly connected thereto, a gantry 24 provided with a pair of laterally spaced legs 25 and 26 supported on bed 20, a carriage 27 mounted on a set of guide rails 28, 29 and 30 provided on the gantry and displaceable along an x-axis by a servomotor mounted on the gantry, drivingly connected thereto and a tool carrier 31 and tool holder 32 mounted on a set of guide rails 33 and 34 provided on carriage 27 and displaceable along a z-axis by a servomotor mounted on carriage 27 and drivingly connected thereto. Such carriage further is provided with a material dispenser 35. Each of such servomotors is operatively connected to a control computer disposed on or in the vicinity of such machine, functional in executing imputed programs for displacing such components along such x, y and z axes.

Figure 2:
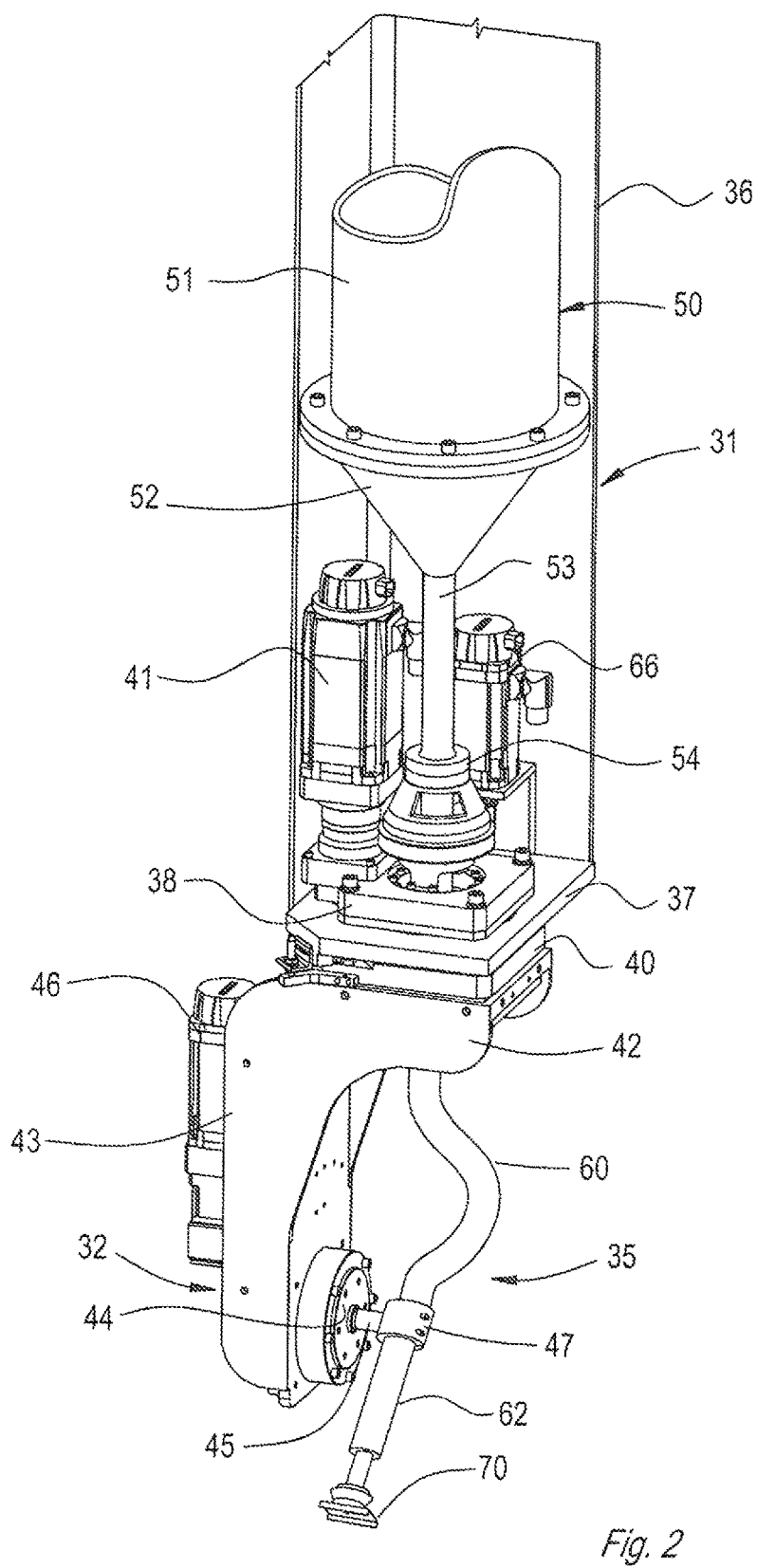
FIG. 2 is an enlarged perspective view of the CNC machine shown in FIG. 1 illustrating, the tool carrier and holder portions thereof, having portions thereof broken away.
Figure 4:
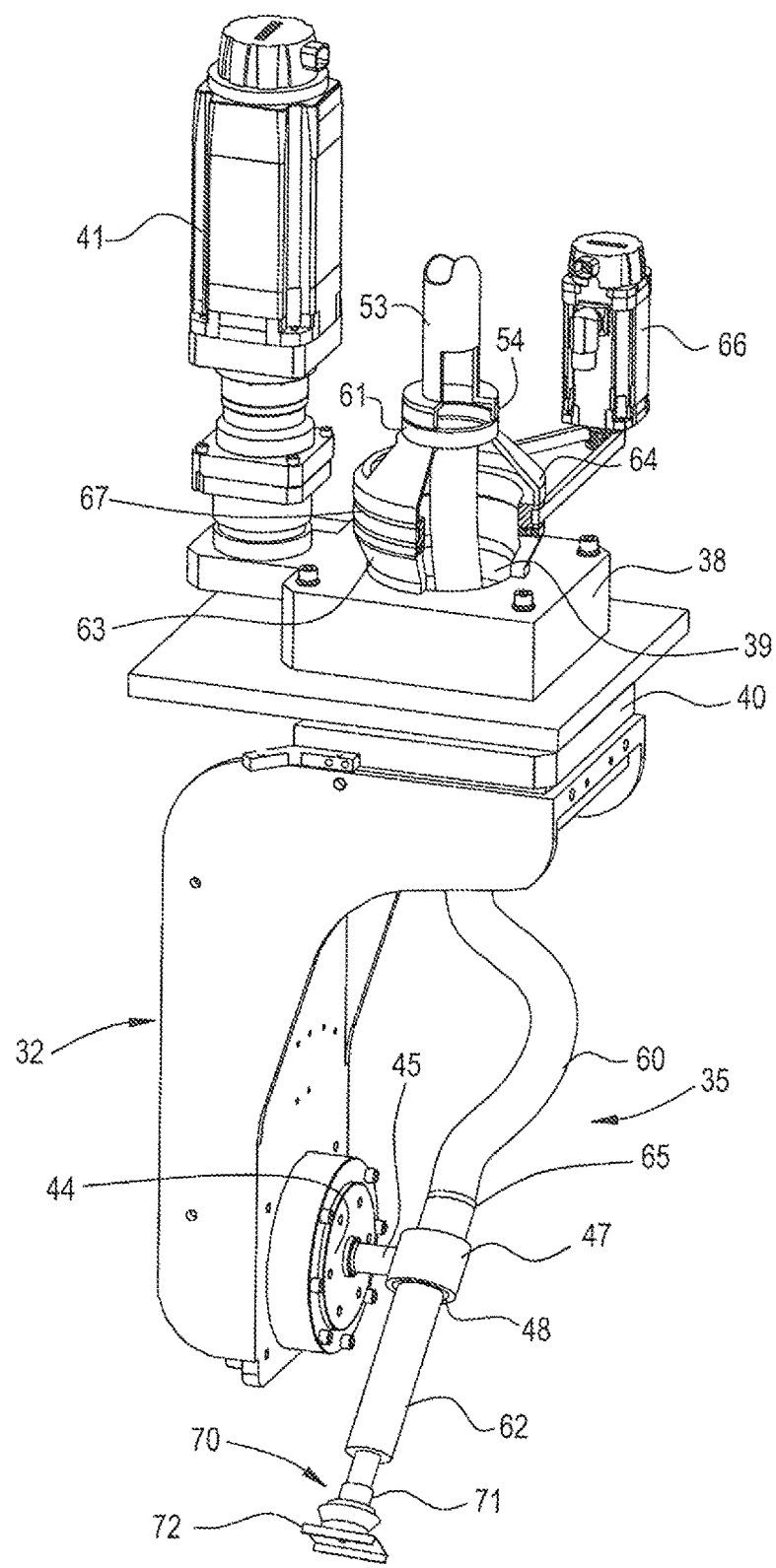
FIG. 4 is a view similar to the view shown in FIG. 2 having portions thereof broken away to more fully illustrate the connections of certain components thereof.

As best shown in FIGS. 2 and 4, carrier 31 includes a vertically disposed housing 36 provided with a support platform 37 having an opening therein disposed along a z-axis. Mounted on the upper side of platform 37 is a gear box 38 provided with an opening 39 vertically aligned with the opening in the support platform. Disposed on the underside of platform 37 is a rotable mounting platform 40 having an opening therethrough coaxial with the opening in platform 37 and gearbox 38, and connected to an annular flange of a depending drivable conduit of gearbox 38. Further mounted on support platform 37 is a servomotor 41 provided with an outlet shaft operatively connected to gearbox 38 for imparting rotational drive to mounting platform 40.

Tool holder 32 depends from carrier 31 and is rotatably displaceable relative thereto about the z-axis of gear box 38 and mounting platform 40. It includes an upper segment 42 connected to mounting platform 40, provided with an opening therethrough coaxially disposed with respect to the aligned openings in gearbox 38, support platform 37 and mounting platform 40, and a depending segment 43 spaced laterally of the z-axis of rotation of platform 40. Mounted on an inner side of segment 43 is a gearbox 44 provided with an output shaft 45 having an axis of rotation lying in an x-y plane intersecting the z-axis of rotation of the tool holder. Such shaft is rotatably displaceable about its axis by means of a servomotor 46 mounted on the depending segment of the tool holder, operatively connected to gearbox 44. Also, mounted on the end of output shaft 45 is a support conduit 47 provided with an axis intersecting both the axis of rotation of shaft 45 and the z-axis of rotation of the tool holder, and a bearing 48.

As best shown in FIG. 2, an extruder 50 of a molten thermoplastic material is provided in an upper portion of housing 36, along the z-axis of the openings in the tool carrier 31 and tool holder. Such extruder 50 includes an upper cylindrical portion 51 provided with a heater and an extruding mechanism for forming and extruding therefrom a molten thermoplastic material, through a lower funnel portion 52 and an outlet tube 53 disposed along the z-axis of the aligned openings in gearbox 38, support platform 37, and rotatable mounting platform 40. An annular collar 54 further is provided at the outlet end of tube 53.

Material applicator 35 as best shown in FIG. 4 includes an insulated, flexible conduit 60 provided with a metallic rim 61 at one end thereof and a rigid, metallic dispenser conduit 62 at the other end thereof.

Mounted on gearbox 38 is an annular base member 63, on which an annular swivel member 64 is rotatably mounted. Rim 61 of hose 60 is rigidly, concentrically connected to swivel member 64 and forms a rotatable union with collar 54 of extruder outlet conduit 53 of extruder 50 to provide a molten material path into and through the upper end of flexible hose 60. The other end of hose 60 is connected to an inlet end of dispenser 62 through an adapter 65. Swivel member 64 along with fixedly mounted tube rim 61 are rotatably displaceable between base member 63 and extruder tube collar 54 by means of a servomotor 66 mounted in support platform 37 and a pulley 67 entrained about a sheave provided on the output shaft of motor 66 and a sheave portion of swivel member 64. Servomotors 41, 46 and 66 also are operated by the control computer pursuant to the execution of an inputted program.

Mounted on the fee end of disperser tube 62 is a material applicator device 70 including a base component 71 and a detachable component 72 of a type as illustrated and described in U.S. Patent Application Publication No. 2016/0288424, published on Oct. 6, 2016, and filed on Apr. 3, 2015, as U.S. application Ser. No. 14/678,286. Generally, component 72 includes an annular segment 73 provided with an annular recess 74 with an axial opening therethrough, and a molten material shaping segment 75 provided with a material guide channel 76, and component 71 which includes a tubular segment 77 insertable in dispenser tube 62, and an appendage segment 78 detachably receivable in the recessed segment of component 72, provided with an opening communicable with the axial passage in component 72 and means for detachably connecting such components together as shown in FIG. 6.

Figure 5:
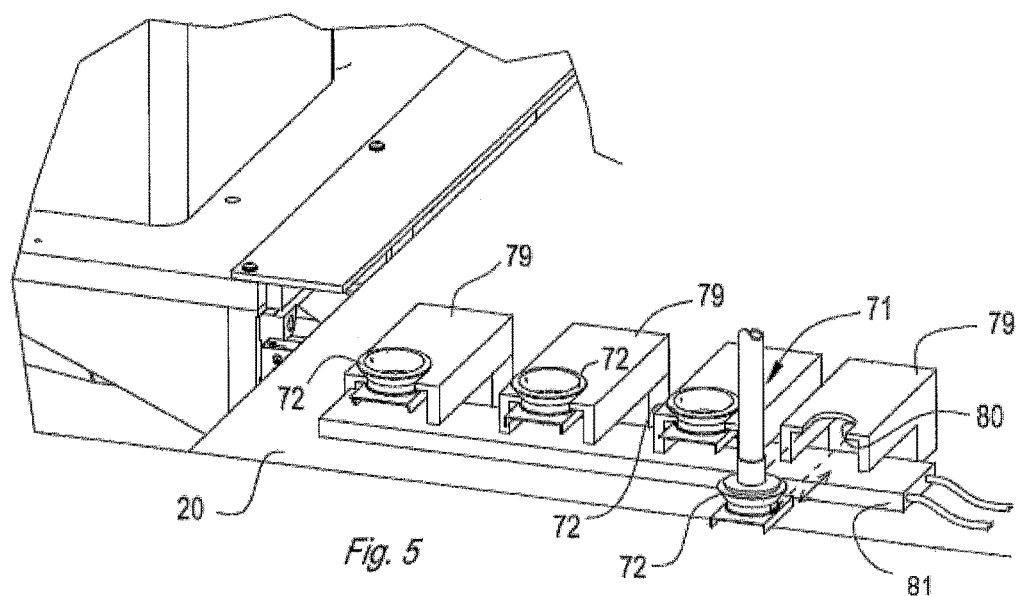
FIG. 5 is a perspective view of a storage rack provided on the worktable of the machine shown in FIG. 1, accommodating a number of applicator components, each provided with a material applying channel having a unique cross-sectional configuration.
Figure 6:
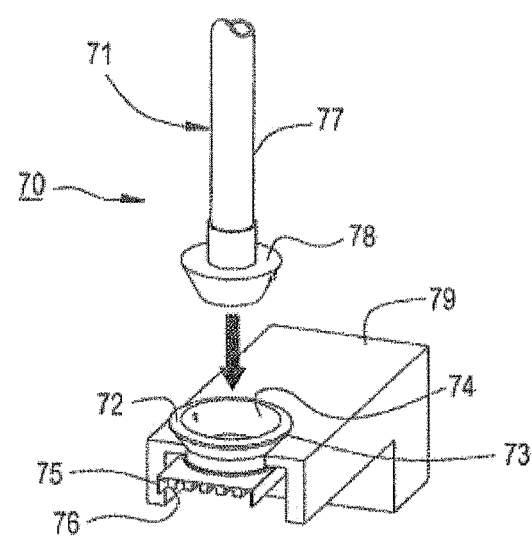
FIG. 6 is a perspective view of a holding bracket of the rack shown in FIG. 5, illustrating the manner by which a detachable applicator component of a device as shown in FIGS. 1 through 4 may be displaced to attach to and be displaced from a selected rack.

An array of components 72, each provided with a differently configured guide channel 76, is provided, mounted on an array of holders 79 positioned on the bed of the machine, as shown in FIGS. 1 and 6, accessible to the tool holder. A leading edge of the top wall of each holder 79 is provided with a recess 80 adapted to receive and support a segment 73 of a component 72. Each segment 73 is provided with a parallel set of laterally opening slots, in the sides thereof, adapted to receive the opposed side edges of the recess of a holder when such segment is slid into such recess to mount on a holder as further shown in FIG. 5. An electrically heated strip 81 also is provided on the machine bed below overextending portions of the top walls of holders 79, functional in maintaining stored segments 72 heated in accommodating the flow of heated material when in use.

In the use of the machine as described to form an article either directly on the workable thereof or on a mold mounted thereon, a supply of pellets of a thermoplastic material is fed into extruder 50, and a suitable program is inputted into the central system of the computer. Upon operation of the machine, the control system will function to heat and churn the extruder to form a molten thermoplastic material, and timely execute the inputted program in causing molten material to flow through flexible tube 60, applicator conduit 62 and dispensing device 70, and operate the several servomotors to displace device 70 linearly along the x, y and z-axes, rotatably about the x axis the axes of shaft 45 and applicator conduit 62 and combinations of such displacements, pursuant to the inputted program, in directing the application of extruded molten material in plies forming the configuration of an intended article. In the course of such operation in which a particular cross-sectional configuration of one or more plies may be required, the program will provide for maneuvering the tool carrier and holder to replace a mounted forming segment 72 by mounting an attached forming segment on a vacant holder 79 and attaching another segment 72 provided with a different, selected cross-sectional configuration.

Figure 3:
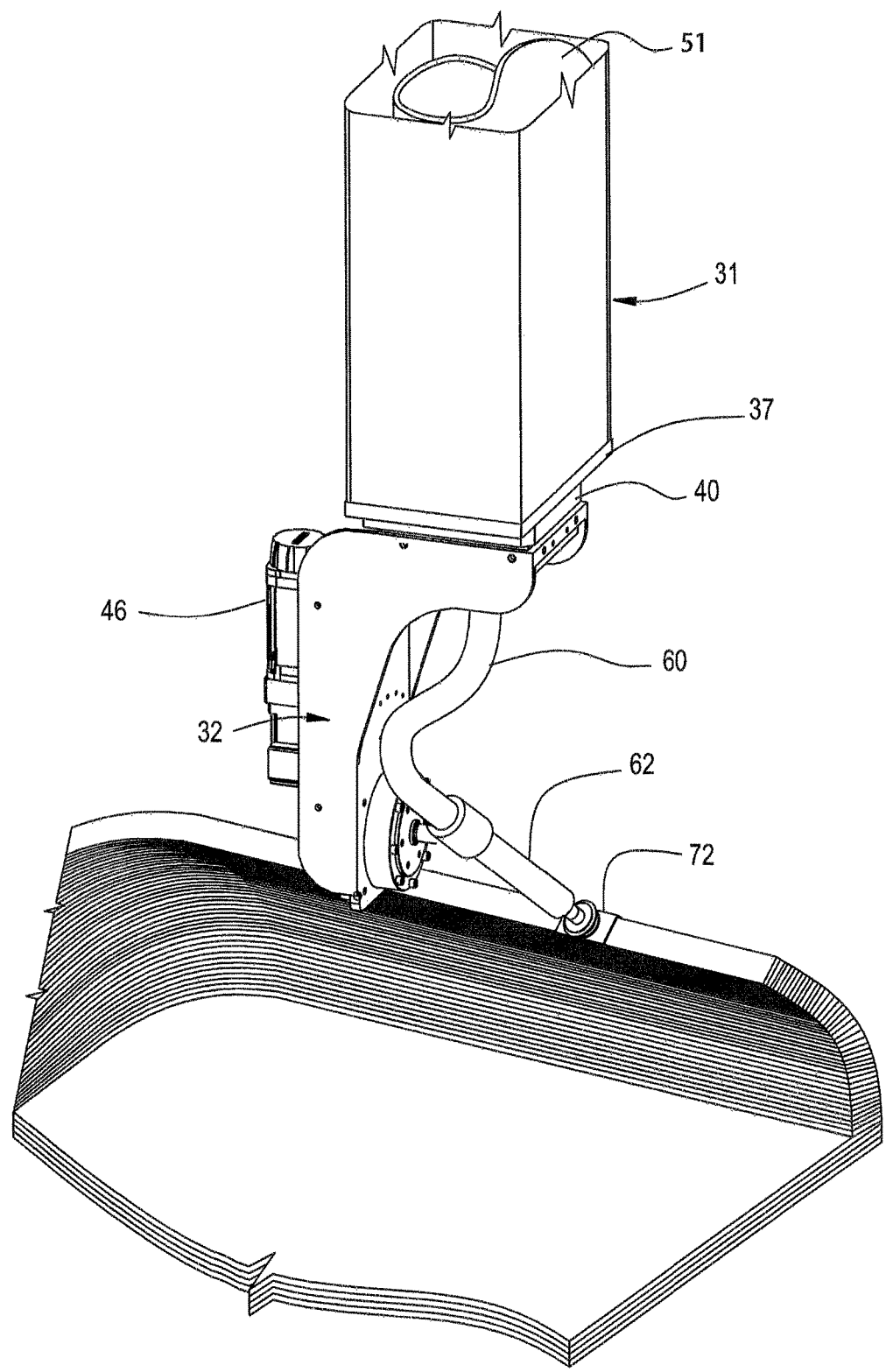
FIG. 3 is another perspective view of the tool carrier shown in FIG. 2, illustrating operation of the described device to form an article.
Figure 7:
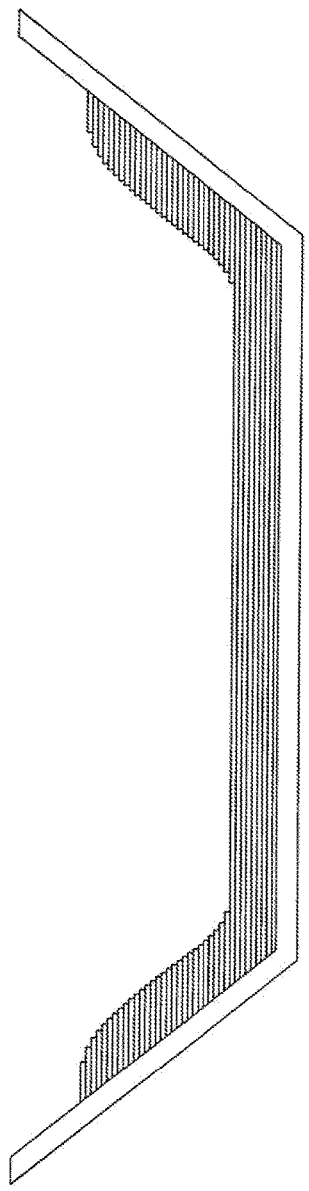
FIG. 7 is vertical, cross-sectional view of an article formed by a machine in the use of a conventional additive manufacturing process.
Figure 8:
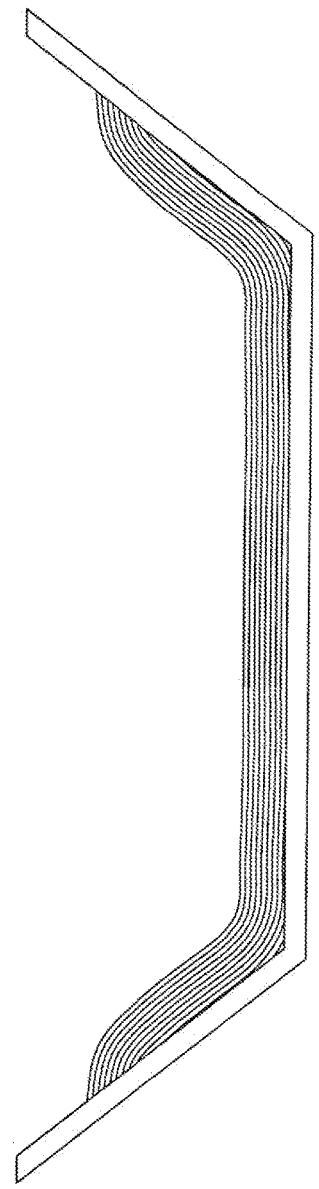
FIG. 8 is a vertical, cross-sectional view of an article formed by the use of the present invention.
Figure 9:
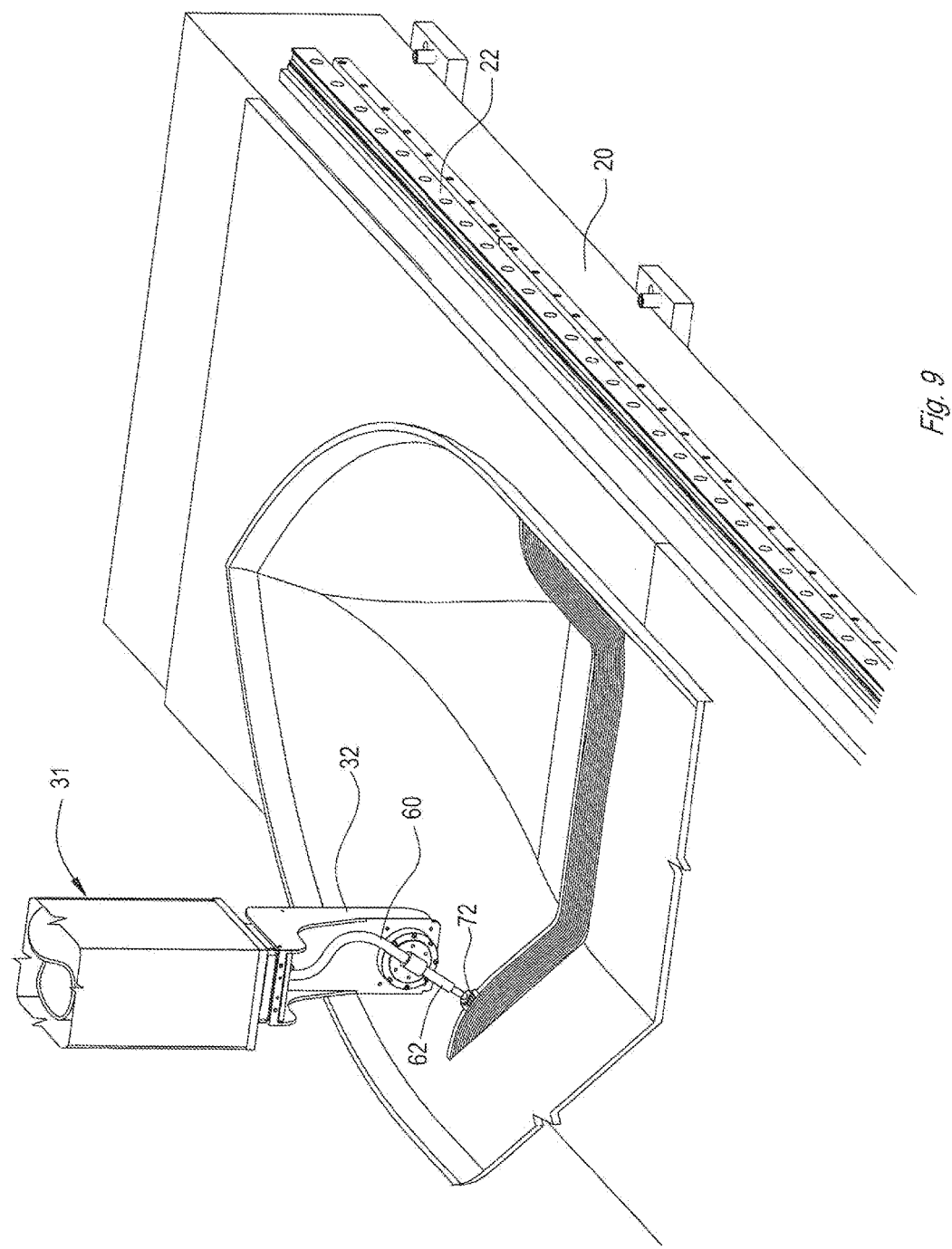
FIG. 9 is a perspective view of a portion of the present invention illustrating the formulation of a portion of the hull of a watercraft, having a portion thereof broken away.

In the use of the machine as described, the plies of molten material deposited in forming the configuration of a particular article, are not applied in strata disposed exclusively in x-y planes as illustrated in FIG. 7, which is characteristic of prior art additive manufacturing machine processors requiring the use of excess material and subsequent material removal but are applied in continuous linear and curved lines as shown in FIGS. 3 and 8, requiring less material and less if any material removal. The machine as described further may be employed to form a curved structure such as the hull of a boat as shown in FIG. 9 provided with a worktable perhaps provided with a suitably contoured recess provided with a suitable coating material.

From the foregoing detailed description, it will be evident that there are a number of changes, adaptations and modifications of the present invention, which come within the province of those persons having ordinary skill in the art to which the aforementioned invention pertains. However, it is intended that all such variations not departing from the spirit of the invention be considered as within the scope thereof as limited solely by the appended claims.

We claim:
1. A CNC machine operable in producing an article of a selected configuration, comprising:
- a worktable supported on a bed, having a support surface disposed in an x-y plane, disposed in one of a fixed condition on said bed and a displaceable condition along a y-axis;
- a gantry supported on said bed along an x-axis, disposed in one of a fixed condition on said bed with said worktable displaceable along the y-axis and a displaceable condition along the y-axis on said bed with said worktable disposed in a fixed condition on said bed;
- a carriage mounted on said gantry, displaceable along an x-axis;
- a tool carrier mounted on said carriage, displaceable along a z-axis, provided with an extruder for forming a thermoplastic material extrudable through an outlet conduit;
- a tool holder mounted on said tool carrier, rotatably displaceable about a z-axis;
- a tool support shaft provided with an axis disposed in an x-y plane, journaled in said tool holder and rotatably displaceable about the axis thereof;
- a dispenser conduit mounted on said tool support shaft, disposed perpendicularly relative to the axis thereof accommodating an applicator at an outlet end thereof;
- an extruding mechanism mounted on said dispenser conduit configured to extrude through an outlet thereof a bead of said thermoplastic material; and
- a flexible hose provided with a first end supported on said tool carrier, forming a rotary union with said outlet conduit of said extruder, and a second end communicating with and attached to an inlet end of said dispenser conduit, wherein said first end of said flexible hose extends through an opening in a carrier bottom wall disposed along said z-axis, is connected to a swivel supported on said carrier bottom wall and rotatable about said z-axis, and connected to said outlet conduit of said extruder via a rotary union disposed along said z-axis; and said second end of said flexible hose includes said dispenser conduit journaled in a bearing disposed in a support conduit mounted on said tool support shaft perpendicularly relative to the axis thereof; and
- a first servomotor for selectively rotatably displacing said swivel member, imparting a rotational displacement of said first end of said flexible hose within said rotary union with said outlet conduit of said extruder and corresponding rotational displacement of said dispenser conduit disposed on said second end of said flexible hose, journaled in said bearing disposed in said support conduit mounted on said tool support shaft.

2. The CNC machine according to claim 1, wherein said worktable is displaceable along a set of rails provided on said bed and is displaceable by a second servomotor mounted on said bed, having a threaded output shaft received in a threaded opening of said worktable.

3. The CNC machine of claim 1, wherein said gantry is displaceable along a set of rails provided on said bed and is displaceable by a third servomotor mounted on said bed, having a threaded output shaft received in a threaded opening in a support portion of said gantry.

4. The CNC machine of claim 1, wherein said carriage is displaceable along a set of rails provided on said gantry and is displaceable along said set of rails by a fourth servomotor mounted on said gantry, having an output shaft threadedly engageable with a portion of said carriage.

5. The CNC machine of claim 1, wherein said tool holder is pivotally connected to and dependent from a bottom wall of said tool carrier and is rotatably displaceable by a fifth servomotor mounted on said bottom wall having a shaft with a gear engaging a gear of said tool holder.

6. The CNC machine of claim 1, wherein the axis of said tool support shaft of said tool holder is disposed in an x-y plane and intersects the axis of rotation of said tool holder, and said shaft is rotatably displaceable about it axis by a sixth servomotor mounted on said tool holder, provided with an output shaft having a gear meshing with a gear of said tool support shaft.

7. The CNC machine of claim 1, wherein said dispenser conduit is journaled within a bearing disposed in a cylindrical member mounted perpendicular to the axis of said tool support shaft.

8. The CNC machine of claim 1, wherein said extruding mechanism includes a material shaping portion configured to shape the cross-sectional configuration of said bead.

9. The CNC machine of claim 1, wherein the axis of rotation of said tool holder, the axis of said tool support shaft, and the axis of said dispenser conduit intersect.

10. The CNC machine of claim 4, wherein said carriage tool carrier includes:
- a bottom platform wall provided with an opening disposed along a z-axis;
- an extruder disposed above said platform wall provided with an outlet disposed along said z-axis;
- an annular, swivable member supported on said platform wall concentric with said extruder outlet, along said z-axis; and
- a gearbox supported on said platform wall for incrementally rotatably displacing said swivable member,
- wherein an end of said flexible hose is connected concentrically with said swivel member, forming a rotary union with said extruder outlet, providing a passageway from said extruder into said flexible hose along said z-axis.

11. The CNC machine of claim 10, wherein said extruder includes an upper cylindrical portion and a lower funnel portion, said upper cylindrical portion comprising a heater and an extruding mechanism for forming and extruding a molten thermoplastic material, and configured to extrude said material through an outlet tube of said lower funnel portion, and further configured to extrude a bead of molten thermoplastic material into said flexible hose.

12. The CNC machine of claim 10, wherein the gearbox is coupled to the first servomotor mounted on said bottom platform wall drivingly connected to said swivel member by means of a pulley.

13. The CNC machine of claim 5, wherein said tool holder includes a first segment pivotally mounted on the underside of a bottom wall of said tool carrier for rotation about said z-axis, provided with an opening therein aligned with an opening in said bottom wall for receiving a portion of said flexible hose therethough, and a second segment depending from said first segment, spaced laterally of said z-axis and supporting said tool support shaft.

14. The CNC machine of claim 6, including said support conduit disposed on the end of said tool support shaft, having an axis disposed perpendicularly relative to the axis of said shaft, and a bearing disposed in said support conduit wherein said dispenser conduit is journaled in bearing of said support conduit.

15. The CNC machine of claim 1, wherein said flexible hose is rotatable about a centerline thereof formed of a heat retentive material, has a first end projecting through an opening in said tool carrier and connected to said outlet of said extruder of said thermoplastic material by means of a rotary union, and a second end provided with said dispenser conduit journaled in a bearing disposed on said tool support shaft.

16. The CNC machine of claim 15, including an applicator provided with a first segment mounted on said dispenser conduit, having an opening therethrough communicating with the passageway of said dispenser conduit, and a second segment detachably connected to said first segment, provided with a bead forming channel having an inlet communicable with said first segment opening when said second segment is attached to said first segment, and a selected cross-sectional configuration.

17. The CNC machine of claim 16, wherein said bead forming channel of said second segment is of a unique cross-sectional configuration.

18. The CNC machine of claim 17, including means disposed on said machine for storing said second applicator segments, accessible by said first applicator segment for attaching and detaching a selected one of said second applicator segments.

19. The CNC machine of claim 16, wherein one of said applicator segments includes a recess and the other of said applicator segments is provided with a portion nestable in said recess in said other applicator segment, wherein said recess and nestable portion are provided with at least one spring loaded plunger on one of said segments cooperable with a mating recess in the other of said nestable segments to detachably secure said nested segments together.

20. An assembly mountable on a machine provided with a worktable supported on a bed, having a support surface disposed in an x-y plane, disposed in one of a fixed condition on said bed and a displaceable condition along a y-axis, a gantry supported on said bed along an x-axis, disposed in one of a fixed condition on said bed with said worktable displaceable along a y-axis and a displaceable condition along the y-axis on said bed with said worktable in a fixed condition, comprising:
   a carriage mountable on said gantry, displaceable along an x-axis;
   a tool carrier mounted on said carriage, displaceable along a z-axis, provided with an extruder for forming a thermoplastic material extrudable through an outlet conduit;
   a tool holder mounted on said tool carrier, displaceable about the z-axis;
   a tool support shaft provided with an axis disposed in an x-y plane, journaled in said tool holder and rotatably displaceable about the axis thereof;
   a dispenser conduit mounted on said tool support shaft, disposed perpendicularly relative to the axis thereof;
   a material applicator device mountable on said dispenser conduit for ejecting through an outlet thereof, a bead of said thermoplastic material;
   a flexible hose provided with a first end supported on said tool carrier, forming a rotary union with said outlet conduit of said extruder, and a second end communicating with and attached to an inlet of said dispenser conduit, wherein said first end of said flexible hose extends through an opening in a carrier bottom wall disposed along said z-axis, is connected to a swivel supported on said carrier bottom wall and rotatable about said z-axis, and connected to said outlet conduit of said extruder by means of a rotary union disposed along said z-axis; and said second end of said flexible hose includes said dispenser conduit journaled in a bearing disposed in a support conduit mounted on said tool support shaft perpendicularly relative to the axis thereof,
   wherein said carriage is displaceable along said x-axis by a first servomotor mounted on the gantry, said tool holder depends from said tool carrier and is rotatably displaceable relative thereto about said z-axis by a gearbox operatively connected to a second servomotor, said tool support shaft is rotatably displaceable about its axis by a third servomotor, and wherein said flexible hose is rotatably displaceable about its centerline by a fourth servomotor, wherein
   said fourth servomotor is configured for selectively rotatably displacing said swivel member, imparting a rotational displacement of said first end of said flexible hose within said rotary union with said outlet conduit of said extruder and corresponding rotational displacement of said dispenser conduit disposed on said second end of said flexible hose, journaled in said bearing disposed in said conduit mounted on said tool support shaft.

21. The assembly of claim 20, wherein said tool carrier includes said extruder, said extruder comprising:
   an upper cylindrical portion and a lower funnel portion, said upper cylindrical portion comprising a heater and an extruding mechanism for forming and extruding said thermoplastic material, and configured to extrude said material through an outlet tube of said lower funnel portion and into and through said flexible hose.

22. The assembly of claim 20, wherein said tool carrier includes;
   a bottom platform wall provided with an opening along an z-axis;
   an annular, swivable member supported on said platform wall concentric with said extruder outlet and said platform wall opening; and
   means supported on said platform wall for incrementally rotatably displacing said swivable member,
   wherein an end of said flexible hose is received through said platform wall opening and connected concentrically with said swivel member, forming a rotary union with said extruder outlet, providing a passageway from said extruder outlet into and through said flexible hose.

23. The assembly of claim 22, wherein said means supported on said platform wall incrementally rotatably displacing said swivable member comprises said fourth servomotor mounted on said platform wall drivingly connected to said swivel member by means of a pulley.

24. The assembly of claim 20, wherein said tool holder includes:
   a member including a first segment pivotally connected and depending from a bottom wall of said tool carrier and rotatably displaceable about said z-axis, having an opening therein communicating with said opening in said tool carrier bottom wall, along said z-axis, and a second segment projecting downwardly from said first segment and spaced laterally of said z-axis; and
   wherein said second servomotor is mounted on said bottom wall of said tool carrier and operatively connected to said first segment for rotatably displacing said depending member.

25. The assembly of claim 24, wherein said means for rotatably displacing said depending member includes said servomotor supported on said tool carrier bottom wall, drivingly connected to said first segment of said depending member through a gear assembly.

26. The assembly of claim 20, wherein said tool support shaft is journaled in a depending segment of said tool holder spaced laterally of said z-axis, and said means operatively connectable to means for rotatably displacement about its axis includes said third servomotor mounted on said tool holder drivingly connected to said tool support shaft through a gear assembly.

27. The assembly of claim 20, wherein the fourth servomotor is supported on said tool carrier and a drive pulley trained about an output of said fourth servomotor and an input of said swivel member.

* * * * *